3,481,715
SEALING MEMBER FOR HIGH TEMPERATURE APPLICATIONS AND A PROCESS OF PRODUCING THE SAME
Thomas J. Whalen, Detroit, and Roy L. van Alsten, Redford Township, Wayne County, Mich., assignors to Ford Motor Company, Dearborn, Mich., a corporation of Delaware
No Drawing. Filed Feb. 3, 1967, Ser. No. 613,920
Int. Cl. B22f 7/04
U.S. Cl. 29—195                                8 Claims

ABSTRACT OF THE DISCLOSURE

This disclosure describes a sealing member having a low coefficient of friction and a good life at high temperatures, particularly when used as a rubbing seal on ceramic materials. The preferred sealing member comprises a steel base, an intermediate layer of a nickel-aluminum or a nickel-chromium alloy, and a surface layer comprising nickel oxide, calcium fluoride, and calcium oxide. A process for applying the intermediate and surface layers by means of a plasma torch using an ionized inert gas also is disclosed.

Summary of the invention

Rotary regenerators for gas turbine engines now are being made of a ceramic material that does not use conventional sealing material efficiently. It is necessary to seal segments of the regenerator as well as its periphery so any sealing material must have a low coefficient of friction to prevent undue loads on the ceramic material in addition to being capable of operating at temperatures up to and exceeding about 1600° F.

This invention provides a sealing member having a low coefficient of friction and excellent resistance to oxidation at high temperatures, particularly when rubbing against ceramic materials. The sealing member comprises a surface layer of nickel oxide, calcium fluoride and calcium oxide on a steel base. An intermediate layer comprising an alloy of nickel with aluminum or chromium can be used to improve the adhesion of the surface layer to the base if desired.

One process of producing the sealing member comprises applying a layer of an alloy of nickel with aluminum or chromium to the base and then applying the surface layer of a product obtained by the reaction in air of nickel oxide and calcium fluoride. Both layers can be applied by means of a torch. The product used to form the surface layer can be made by milling nickel oxide powder with calcium fluoride powder and sintering the resulting mixture in air at a temperature exceeding 2000° F. After crushing and repowdering, the sintered product is applied by means of a high energy plasma gun using an inert gas such as argon.

Detailed description

Austenitic stainless steel preferably is used as the steel base of the sealing member of this invention. After cleaning and grinding, base is coated with a layer of nickel aluminide or nickel chromium. A typical nickel aluminide material is sold as Metco 404 by Metco Incorporated, 1101 Prospect Ave., Westbury, N.Y. A surface layer comprising nickel oxide, calcium fluoride, and calcium oxide then is applied over the intermediate layer. A good combination of seal life and material economy is obtained with intermediate layers at least 0.004 inch thick and surface layers at least 0.010 inch thick. The thickness of the intermediate layer generally does not exceed 0.006 inch, and the thickness of the surface layer generally does not exceed 0.020 inch.

Surface layers comprising 55 to 85 weight percent of nickel oxide produce the best combination of low friction and good life at higher temperatures. In general, these preferred surface layers contain no more than 10 weight percent of calcium oxide. Significant amounts of iron oxide must be kept out of the surface layer as the presence of iron oxide therein affects detrimentally the friction coefficient of the sealing member on ceramics.

The preferred process of producing the sealing members of this invention comprises applying the layers by a flame spraying process. In the preferred process, an inert gas such as argon is passed between a copper anode and a tungsten cathode in a high energy plasma gun which ionizes the gas. A powder capable of forming the desired composition is introduced into the gun which converts the powder into a molten state. The molten material then is sprayed onto the object to form a uniform adherent layer. Other inert gases such as nitrogen, xenon or helium can be used in place of argon. Jets of cooling or heating gases are used to maintain the base at a temperature at which the molten material will solidify. Typical plasma guns are sold by the Avco Bay State Abrasives Division, Industrial Products Subdivision, Westboro, Mass.

Making the material for the surface layer comprises milling nickel oxide powder and calcium fluoride powder together for several hours to produce an intimate mixture and then sintering the mixture in air. During the sintering operation, a portion of the calcium fluoride is converted into calcium oxide. The sintered product is powdered by a hammer mill and then is applied to the intermediate layer or the base by a plasma gun.

Example

An intermediate layer of nickel aluminide is applied to a 430 series stainless steel base using an Avco Model PG 100 plasma gun. The gun is set to use 0.7 cubic feet per hour of working gas and 0.03 cubic feet per hour of powder gas. Powder is fed to the gun at the rate of 3 pounds per hour, and the vibrator on the powder feed mechanism is set at No. 3. Argon is used as the gas and electrical energy is supplied to the gun in the form of 500 amperes at 35 volts. The resulting intermediate layer contains approximately equal parts of NiAl and $Ni_3Al$ and is about 82 weight percent nickel.

A surface layer of a material made from the reaction product of 80 percent nickel oxide and 20 percent calcium fluoride in air at 2400° F. is applied to the intermediate layer using the same plasma gun. The same rates of working gas and powder gas are used. The powder feed is at the rate of 0.6 pound per hour using a vibrator setting of 3. Argon gas again is used as the inert material and the electrical energy applied to the gun is 600 amperes at 38 volts.

The resulting surface layer is smoothed by grinding and the sealing member is installed as the high temperature regenerator seal in a gas turbine engine having a ceramic regenerator. Its coefficient of friction ranges from 0.2 to 0.3 and the sealing member has been operated for over 200 hours at gas temperatures exceeding 1600° F. without serious gas leakage or wear.

Thus, this invention provides a sealing member having a low coefficient of friction when used on ceramic materials and excellent resistance to oxidation at high temperatures. Rotating ceramic regenerators of gas turbine engines are one application in which the sealing member provided by this invention is used to great advantage.

Claimed is:
1. A sealing member having a low coefficient of friction and excellent resistance to oxidation at high temperatures when rubbing against a ceramic material comprising a steel base with a surface layer thereon consisting essentially of about 55 to 85 weight percent nickel oxide, up to about 10 weight percent calcium oxide, remainder calcium fluoride.

2. The sealing member of claim 1 comprising an intermediate layer of a nickel aluminum alloy or a nickel chromium alloy.

3. The sealing member of claim 2 in which the steel base is austenitic stainless steel.

4. The sealing member of claim 3 in which the intermediate layer is at least 0.003 inch thick and the surface layer is at least 0.010 inch thick.

5. The sealing member of claim 1 in which the steel base is austenitic stainless steel.

6. A process of producing a coated austenitic stainless steel sealing member having a low coefficient of friction and excellent resistance to oxidation at high temperatures when rubbing against a ceramic material comprising applying to the surface of an austenitic stainless steel member by means of a torch a layer of an alloy of nickel and aluminum and applying to said layer by means of a torch a surface layer of a product obtained by intimately mixing nickel oxide and calcium fluoride, sintering the mixture in air at a temperature exceeding 2000° F., and repowdering the sintered mixture into a powder suitable for application by a plasma gun, said surface layer consisting essentially of about 55–85 weight percent nickel oxide, up to about 10 weight percent calcium oxide, remainder calcium fluoride.

7. The process of claim 6 in which the torch is a plasma gun using an inert gas.

8. The process of claim 7 in which the inert gas is argon.

References Cited

UNITED STATES PATENTS

| | | | |
|---|---|---|---|
| 2,707,691 | 5/1955 | Wheildon | 117—105.2 |
| 2,823,139 | 2/1958 | Schulze et al. | |
| 3,006,782 | 10/1961 | Wheildon. | |
| 3,010,480 | 11/1961 | Ragsdale. | |
| 3,413,136 | 11/1968 | Emanuelson el al. | 117—93.1 X |

FOREIGN PATENTS

| | | |
|---|---|---|
| 1,003,118 | 9/1965 | Great Britain. |

OTHER REFERENCES

Flame-Sprayed Coatings, in Product Engineering, 36(25): pp. 59–61, Dec. 6, 1965.

ALFRED L. LEAVITT, Primary Examiner

J. R. BATTEN, JR., Assistant Examiner

U.S. Cl. X.R.

29—196.2, 196.6, 197; 106—63; 117—69, 71, 93.1, 105, 105.2, 127; 264—62